United States Patent [19]
Johs

[11] Patent Number: 5,929,995
[45] Date of Patent: Jul. 27, 1999

[54] SYSTEM AND METHOD FOR DIRECTING ELECTROMAGNETIC BEAMS

[75] Inventor: Blaine D. Johs, Lincoln, Nebr.

[73] Assignee: J.A. Woollam Co. Inc., Lincoln, Nebr.

[21] Appl. No.: 09/174,885

[22] Filed: Oct. 19, 1998

Related U.S. Application Data

[63] Continuation-in-part of application No. 09/033,694, Mar. 3, 1998, and a continuation-in-part of application No. 09/144,764, Aug. 31, 1998

[60] Provisional application No. 60/094,104, Jul. 24, 1998.

[51] Int. Cl.⁶ .................................................. G01B 11/00
[52] U.S. Cl. .......................................... 356/369; 356/382
[58] Field of Search ...................................... 356/364, 365, 356/366, 367, 368, 369, 381, 382; 250/225; 118/708, 712; 438/16, 693

[56] References Cited

U.S. PATENT DOCUMENTS

| | | | |
|---|---|---|---|
| 2,845,838 | 8/1958 | Lindberg et al. | 356/382 |
| 3,874,797 | 4/1975 | Kasai | 356/118 |
| 4,381,151 | 4/1983 | Smith | 356/369 |
| 4,801,798 | 1/1989 | Lange | 250/225 |
| 5,209,813 | 5/1993 | Oshida et al. | 356/382 |
| 5,337,146 | 8/1994 | Azzam | 356/367 |
| 5,343,293 | 8/1994 | Berger et al. | 356/382 |
| 5,373,359 | 12/1994 | Woollam et al. | 356/328 |
| 5,416,588 | 5/1995 | Ducharme et al. | 356/369 |
| 5,504,582 | 4/1996 | Johs et al. | 356/369 |
| 5,521,706 | 5/1996 | Green et al. | 356/369 |
| 5,582,646 | 12/1996 | Woollam et al. | 118/708 |
| 5,706,087 | 1/1998 | Thompson et al. | 356/364 |

OTHER PUBLICATIONS

Division–of–Amplitude Photopolarimeter Based on Conical . . . Azzam, Applied Optics, vol. 31, No. 19, (Jul. 1992).

In Situ Spectroscopic Ellipsometry for Advanced Process . . . Lehnert et al., Thin Film Solids, (1998).

Regression Calibration Method for Rotating Element . . . Johs, Thin Solid Films, (1993).

*Primary Examiner*—Hoa Q. Pham
*Attorney, Agent, or Firm*—James D. Welch

[57] ABSTRACT

Disclosed is an electromagnetic beam directing system and method which enables changing the direction of propagation of a spectroscopic beam of electromagnetic radiation while maintaining significant sensitivity of both (PSI) and (DELTA) ellipsometric parameters to changes in surfaces of monitored sample systems, while minimizing sensitivity to changes in electromagnetic beam directing means orientation.

12 Claims, 3 Drawing Sheets

SYSTEM AND METHOD FOR DIRECTING ELECTROMAGNETIC BEAMS

This Application is a Continuation-In-Part of co-pending application Ser. No. 09/033,694 filed Mar. 3, 1998, and of Provisional Application 60/094,104 filed Jul. 24, 1998, and of Co-pending application Ser. No. 09/144,764 filed Aug. 31, 1998.

TECHNICAL FIELD

The present invention relates to electromagnetic beam directing systems and methods which find application in ellipsometry and polarimetry and the like. More particularly, the present invention is an electromagnetic beam directing system and method which enables changing the direction of propagation of a beam of electromagnetic radiation while maintaining significant sensitivity of both (PSI) and (DELTA) ellipsometric parameters, to changes in surfaces of monitored sample systems, while minimizing sensitivity to minor changes in orientation of electromagnetic beam directing system means.

BACKGROUND

It is well known that ellipsometer and polarimeter systems allow determination of sample system physical and optical properties, (such as thickness, refractive index and extinction coefficient of surface films thereon), by detecting changein "Polarization State" and/or Intensity of a beam of polarized light which is caused to interact with said sample system, where Polarization State here refers to a set of values for Polarized Light Beam Orthogonal Components, (such as "S" and "P"), Magnitude Ratio, and a Phase Angle therebetween. (It is noted that "P" refers to that component which is in a plane containing the normal to a sample system and incident and/or transmitted beam(s) of polarized light, and "S" refers to that component perpendicular thereto and parallel to the surface of said sample system. It is also noted that a "full" polarization state also requires designation of an absolute value to which a magnitude ratio is referenced, and the direction of rotation of a polarized beam of light).

It is also noted that while ellipsometer and polarimeter systems are finding increased application in vacuum systems which are utilized in material deposition and etching, (to mediate sample system monitoring and process control), many such applications involve retrofitting an ellipsometer or polarimeter system to a vacuum system which has component geometry that makes it difficult to direct an electromagnetic beam from a source thereof such that it interacts with a sample system within a vacuum chamber. In particular, sample system containing vacuum chambers often have, for instance, complex sputtering or electron beam source means and robotics means present therewithin, which an ellipsometer or polarimeter electromagnetic beam must circumvent to arrive at a sample system therewithin.

Continuing, as general background, it should be appreciated that ellipsometer systems can be broadly classified as:
1. Rotatable Element or Intensity Modulating Rotating Element Ellipsometers (REE); and
2. Phase Modulating Modulation Element Ellipsometers (MEE).

An example, for instance, is presented in a Patent to Woollam et al., U.S. Pat. No. 5,373,359, which describes a Rotating Analyzer Ellipsometer (RAE) in which a Light Source provided beam of light is caused to pass through a Polarizer, (which serves to set a Polarization State therein), then interact with a sample system. Said interaction with said sample system serves to alter the Polarization State of said polarized beam of light, which polarized beam of light then sequentially encounters a Rotating Analyzer and a Dispersion Optics, (eg. a Diffraction Grating is specified), which forms therefrom a multiplicity of essentially single wavelength polarized beams of light. Said multiplicity of essentially single wavelength polarized beams of light are then caused to enter a Photo Detector Array, in which Photo Detector Array, individual Detector Elements serve to develop a representative signal for each. Fourier Analysis, for instance, of said signals allows determination of parameters which allow determination of sample system characterizing PSI and DELTA values. It is noted that in said Woollam et al. (RAE) there is no additional focusing applied after the polarized beam of light encounters the sample system. Additional Patents to Johs et al. and Green et al., U.S. Pat. Nos. 5,504,582 and 5,521,706 respectively provide further insight into rotating analyzer ellipsometer systems.

Another U.S. Pat. No. 5,416,588 to Ducharme et al., describes a Modulation Element Ellipsometer (MEE) comprised of a Light Source, a Polarizer, a Polarization State Modulator Element, a means for splitting Orthogonal Components in a Beam of Polarized Light after interaction with a sample system, two Detector Elements and an Analysis system. In use a beam of light is provided by the Light Source and a state of Polarization is set therein by said Polarizer, after which the polarized beam of light is subjected to a Polarization State Modulation and caused to interact with a sample system, which sample system changes the State of Polarization of said Phase Modulated Polarized beam of light. Orthogonal Components of said Polarized beam of Light are then isolated and subjected to separate, for instance, Fourier Analysis. Appropriate utilization of the Coefficients of the terms of a Fourier Series allows determination of sample system characterizing PSI and DELTA values. It is noted the described Modulation Element Ellipsometer (MEE) utilizes Coefficients from Fourier Series based upon both Orthogonal Components. Some Modulation Ellipsometers utilize Fourier Series Coefficients from only one such Orthogonal Component. While the specifics of signal generation are different in (REE) and (MEE) ellipsometers, and even amongst Ellipsometers of similar type, the end result of utilization thereof is provision of PSI and DELTA values for sample systems analyzed therein.

Another U.S. Pat. No. 5,706,087 to Thompson et al. describes a system for changing the direction of a beam of electromagnetic radiation so that sample systems which can not be easily situated on a sample system supporting stage in an ellipsometer or polarimeter or the like system can be investigated without reconfiguration. Said system comprises an electromagnetic beam directing means which is easily mounted to said sample system supporting stage.

Another Patent to Woollam et al., U.S. Pat. No. 5,582,646, describes a method and system for allowing investigation of sample systems utilizing a spectroscopic electromagnetic beam which is caused to impinge on a sample system at an angle greatly in excess of the Brewster Angle, (which is nominally seventy-five (75) degrees for semiconductors). Said 646 Patent identifies certain wavelengths in a spectroscopic range of wavelengths in which ellipsometric DELTA sensitivity to changes in an investigated sample system is sufficiently high to detect small changes in an investigated sample system. Said 646 Patent system finds application in vacuum deposition, (eg. MBE), systems which are provided with ports to which RHEED systems are normally connected, which ports provide for glancing angles of incidence of electrons, (eg. eighty-five (85) degrees), caused to impinge thereupon. Rather than connect a RHEED system, an ellipsometer system can be connected at the RHEED port and an electromagnetic beam be caused to impinge on said sample system at said glancing angles of incidence of electrons, (eg. eighty-five (85) degrees). While this greatly diminishes DELTA sensitivity to changes in sample system at most wavelengths, it is found that when appropriate wavelengths are monitored, DELTA sensitivity remains high.

A system which allows use of electromagnetic beams caused to impinge upon a sample at less than a Brewster Angle is identified in co-pending patent application Ser. No. 09/033,694. Said 694 Application describes a system wherein a beam of electromagnetic radiation can be made to impinge upon a sample system at an angle-of-incidence which is below, (eg. 65 degrees), a typical Brewster Angle, which Brewster angle is, again, near seventy-five (75) degrees in most semiconductors. A typical range of angle-of-incidence over which the said invention can be applied, however, is between thirty (30) and eighty (80) degrees from a normal to a sample system surface, with a range of deviation from a Brewster angle of between five (5) and ten (10) degrees being of particular relevance. It is noted that the present invention provides convenient means by which to achieve a smaller electromagnetic beam "Spot" size, (which accompanies a smaller angle-of-incidence on an investigated material system). The present invention also enables realization of laterally-compact ellipsometer or polarimeter and the like systems.

Generally, the present invention can be applied to essentially any ellipsometer or polarimeter and the like system, and provides a solution to a problem in the use thereof which presents when a sample system is to be investigated with a polarized beam of electromagnetic radiation which is initially oriented in a propagation direction other than appropriate to cause it to impinge upon a sample system, and in which space constraints prevent reorienting the source of the initially oriented polarized beam of electromagnetic radiation. The present invention provides the primary benefit of maintaining both ellipsometric PSI and ellipsometric DELTA sensitivity to changes in investigated sample systems while changing said electromagnetic beam propagation direction.

With an eye to the present invention, a Search of Patents was conducted, with the result being that very little was found. A Patent to Kasai, U.S. Pat. No. 3,874,797 is disclosed, however, as it describes a system for directing an electromagnetic beam utilizing totally reflecting prisms. As well, a Patent to Lange, U. S. Pat. No. 4,801,798 is disclosed as it describes a system which utilizes electromagnetic beam directing reflective means in a system which causes an electromagnetic beam to impinge upon an investigated sample system at an angle very near to a perpendicular to a surface thereof. A Patent to Smith, U.S. Pat. No. 4,381,151 is also disclosed as it describes a system in which numerous reflections of a light beam occur.

A paper titled "Division-Of-Amplitude Photopolarimeter Based on Conical Diffraction For a Metallic Grating" by Azzam, in Applied Optics, Vol. 31, No. 19, Jul. 1, 1992 and U.S. Pat. No. 5,337,146 are also noted. While the system described in said references is somewhat relevant, the purpose of the System and Method of Use described in said references is to allow simultaneous measurement of all four Stokes Parameters of a Beam of Light.

A particularly relevant paper is titled "In Situ Spectroscopic Ellipsometry For Advanced Process Control In Vertical Furnaces", Lehnert et al., Thin Solid Films, 313–314 (1998). Said paper describes means for directing an initially vertically oriented beam of electromagnetic radiation onto a sample system at an angle of between seventy (70) to seventy-five (75) degrees, said means being prisms positioned in a vertically oriented furnace. While this paper describes a system which is observably physically similar to that of the present invention, it does not suggest use of said described system where electromagnetic beams are caused to approach sample systems at angles of incidence below seventy (70) degrees, nor does it provide insight as how to maintain high ellipsometric parameter (ie. PSI and/or DELTA), sensitivity to sample system changes where a beam of electromagnetic radiation is caused to approach a surface of a sample system at an angle-of-incidence significantly less than a Brewster Angle, (ie. less than seventy (70) degrees).

Also, a reference titled "ELLIPSOMETRY AND POLARIZED LIGHT", by Azzam and Bashara, North-Holland, 1977, is incorporated by reference into this Disclosure for the purpose of providing general information regarding sample analysis systems utilizing electromagnetic beams, ellipsometry, polarimetry and fundamentals of electromagnetic beams.

Finally, a paper by Johs titled "Regression Calibration Method For Rotating Element Ellipsometers", Thin Solid Films, 234 (1993), is identified and incorporated by reference into this Disclosure for the purpose of providing general information regarding the use of regression in parameter evaluation in sample analysis systems which utilize electromagnetic beams.

In view of known prior art, it is apparent that a system, and method of its use, which would allow a user of a sample analysis system such as a ellipsometer, polarimeter or a functionally similar system, to investigate sample systems with beams of electromagnetic radiation which are not initially oriented in a propagation direction appropriate to effect interaction with a sample system at below Brewster angles-of-incidence with respect to a normal to a material system surface, without requiring major system reconfiguration procedures be performed, which system and method allow changing the propagation direction of an initial beam of electromagnetic radiation without greatly diminishing the sensitivity of either ellipsometric (PSI) and (DELTA) parameters to changes investigated sample system surface properties, would be of great utility. In particular, such a system, and method of use, would find application in directing electromagnetic beams in vacuum chambers which contain, for instance, complex sputtering or electron beam source means and robotics means present therewithin, which an ellipsometer or polarimeter electromagnetic beam must circumvent to arrive at a present sample system. The present invention provides such a system and method of its use.

DISCLOSURE OF THE INVENTION

In one instance the present invention is an ellipsometer/polarimeter system comprising a source of a polarized spectroscopic beam of electromagnetic radiation; first optional component(s); a first electromagnetic beam directing means; a stage for holding a sample system; second optional component(s); a second electromagnetic beam directing means; and a detector system. In said present invention ellipsometer/polarimeter system each of said first and second electromagnetic beam directing means is an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides. Said present invention ellipsometer/polarimeter system has, in use, a sample system comprising a surface, held in position at said stage for holding a sample system. Said present invention ellipsometer/polarimeter system is arranged such that, in use, said source of a beam of electromagnetic radiation provides a spectroscopic polarized beam of electromagnetic radiation with a direction of propagation oriented so as to enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means, such that said spectroscopic polarized beam of electromagnetic radiation which exits said second or first side of said first electromagnetic beam directing means propagates in direction which has an angle of incidence with respect to a normal to said surface of said sample system of less than seventy (70) degrees. The spectroscopic polarized beam of electromagnetic radiation which reflects from said sample system propagates in a direction so as to enter the first or second side of said second electromagnetic beam directing means, internally reflects from the third side of said second electromagnetic beam directing means at an angle of incidence with respect to a normal to said third side of said second electromagnetic beam directing means, and exits from, respectively, said second or first side of said second electromagnetic beam directing means and propagates therefrom in a direction such that it enters said detector system. Said first electromagnetic beam directing means and said second electromagnetic beam directing means are oriented essentially as mirror images of one another with respect to a plane which is simultaneously perpendicular to the surface of said sample system and to a plane which contains perpendiculars to the third sides of both said first and second electromagnetic beam directing means. The distinguishing improvements in said present invention ellipsometer/polarimeter system are:

a. that each of said first and second electromagnetic beam directing means are made of a material with refractive properties such that when the angle of incidence of said spectroscopic polarized beam of electromagnetic radiation which reflects from the third side thereof, with respect to a normal to said third side is nominally fifty-two (52) degrees, the angle of incidence of said spectroscopic polarized beam of electromagnetic radiation with respect to a normal to a surface of said sample system is less than seventy (70) degrees, and b. when the angle of incidence of said spectroscopic polarized beam of electromagnetic radiation which reflects from the third side of each said first or second electromagnetic beam directing means is varied by plus or minus one (1) degree around said nominal fifty-two (52) degrees, the retardation entered between orthogonal components in said spectroscopic polarized beam of electromagnetic radiation varies by, on the order of one (1) degree at any wavelength between two-hundred-fifty (250) and seven-hundred-fifty (750) nanometers.

A preferred present invention ellipsometer/polarimeter system provides that each of said first and second electromagnetic beam directing means is made of fused quartz and the angle of incidence of said spectroscopic polarized beam of electromagnetic radiation which reflects from the third side thereof, with respect to a normal to said third side, is nominally fifty-two (52) degrees when said angle of incidence of said spectroscopic polarized beam of electromagnetic radiation with respect to a normal to a surface of said sample system is nominally sixty-nine (69) degrees.

In addition, a primary embodiment of the present invention system provides that the first optional component(s) and second optional component(s) each comprise a window in a vacuum chamber, which vacuum chamber contains said first electromagnetic beam directing means, said stage for holding a sample system and said second electromagnetic beam directing means.

Additionally, a present invention ellipsometer/polarimeter system provides that the change in ellipsometric DELTA phase angle between orthogonal components in said spectroscopic polarized beam of electromagnetic radiation which reflects from the third side of each of said first and second electromagnetic beam directing means which is within the range of nominally forty-six (46) to thirty-nine (39) degrees for wavelengths within the respective range of approximately two-hundred-fifty (250) to seven-hundred-fifty (750) nanometers.

The present invention ellipsometer/polarimeter system can be alternatively described as again comprising a source of a polarized spectroscopic beam of electromagnetic radiation; first optional components); a first electromagnetic beam directing means; a stage for holding a sample system; second optional component(s); a second electromagnetic beam directing means; and a detector system; wherein said first optional component(s) and second optional component (s) each comprise a window in a vacuum chamber which contains said first electromagnetic beam directing means, said stage for holding a sample system and said second electromagnetic beam directing means. Again, each of said first and second electromagnetic beam directing means is an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides, and said present invention ellipsometer/polarimeter system has, in use, a sample system comprising a surface, held in position at said stage for holding a sample system. Said ellipsometer/polarimeter system is again arranged such that, in use, said source of a beam of electromagnetic radiation provides a spectroscopic polarized beam of electromagnetic radiation with a direction of propagation oriented so as to pass through said first optional component(s) and enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means. The spectroscopic polarized beam of electromagnetic radiation exiting said second or first side of said first electromagnetic beam directing means propagates in direction which has an angle of incidence with respect to a normal to said surface of said sample system of less than seventy (70) degrees, such that said spectroscopic polarized beam of electromagnetic radiation which reflects from said sample system propagates in a direction so as to enter the first or second side of said second electromagnetic beam directing means, internally reflect from the third side of said second electromagnetic beam directing means at an angle of incidence with respect to a normal to said third side of said second electromagnetic beam directing means, and exit from, respectively, said second or first side of said second electromagnetic beam directing means and propagates therefrom in a direction such that it passes through said second optional component(s) and enters said detector system. Said first electromagnetic beam directing means and said second electromagnetic beam directing means are oriented essentially as mirror images of one another with respect to a plane which is simultaneously perpendicular to the surface of said sample system and to a plane which contains perpendiculars to the third sides of both said first and second electromagnetic beam directing means. The distinguishing improvements of said present invention ellipsometer/polarimeter system in this alternative description are:

a. that each of said first and second electromagnetic beam directing means are made of fused quartz which demonstrates refractive properties such that the angle of incidence of said spectroscopic polarized beam of electromagnetic radiation which reflects from the third side thereof, with respect to a normal to said third side, is nominally fifty-two (52) degrees when said angle of incidence of said spectroscopic polarized beam of electromagnetic radiation with respect to a normal to a surface of said sample system is nominally sixty-nine (69) degrees, and b. that each said first and second electromagnetic beam directing means cause, in use, a change in ellipsometric DELTA phase angle between orthogonal components in said spectroscopic polarized beam of electromagnetic radiation which reflects from the third side of each of said first and second electromagnetic beam directing means which is within the range of approximately forty-six (46) to thirty-nine (39) degrees for wavelengths within the respective range of approximately two-hundred-fifty (250) to seven-hundred-fifty (750) nanometers; and c. that when the angle of incidence of said spectroscopic polarized beam of electromagnetic radiation which reflects from the third side of each said first or second electromagnetic beam directing means is varied by plus or minus one (1) degree around said nominal fifty-two (52) degrees, the retardation entered between orthogonal components in said spectroscopic polarized beam of electromagnetic radiation varies by, on the order of one (1) degree at any wavelength between two-hundred-fifty (250) and seven-hundred-fifty (750) nanometers.

The present invention is, in a second instance a method of investigating ellipsometric properties of a sample system comprising the steps of:

1. providing an ellipsometer/polarimeter system as described infra herein;
2. placing a sample system so that it is held in place at said stage for holding a sample system;
3. causing said source of a polarized spectroscopic beam of electromagnetic radiation to emit a polarized spectroscopic beam of electromagnetic radiation;
4. receiving said beam of spectroscopic polarized radiation in said detector after it has interacted with said first electromagnetic beam directing means, said stage for holding a sample system and said second electromagnetic beam directing means;

such that said detector provides data based upon the received spectroscopic polarized beam of electromagnetic radiation, which data mediates investigation of the ellipsometric properties of said sample system.

The present invention will be better understood by reference to the Detailed Description Section of this Disclosure, in conjunction with the Drawings.

SUMMARY OF THE INVENTION

It is therefore a purpose of the present invention to, in an ellipsometer or polarimeter setting, provide a system, and method of its use, which allows changing an initial propagation direction of a beam of electromagnetic radiation while maintaining significant ellipsometric (PSI) and (DELTA) sensitivity to changes at a surface of a monitored sample system.

It is another purpose of the present invention to, in an ellipsometer or polarimeter setting, provide a system, and method of its use, which allows changing an initial propagation direction of a beam of electromagnetic radiation while minimizing sensitivity to minor changes in orientation of electromagnetic beam directing system means.

It is yet another purpose of the present invention to teach application of a present invention system in real-time vacuum chamber mediated material deposition and etching procedures.

It is another purpose yet of the present invention to teach application of a present invention system in vacuum chamber systems in which are present, for instance, complex sputtering or electron beam source means and sample system handling robotics etc. which an ellipsometer or polarimeter beam of electromagnetic radiation must circumvent in use.

DETAILED DESCRIPTION

Figure 1:
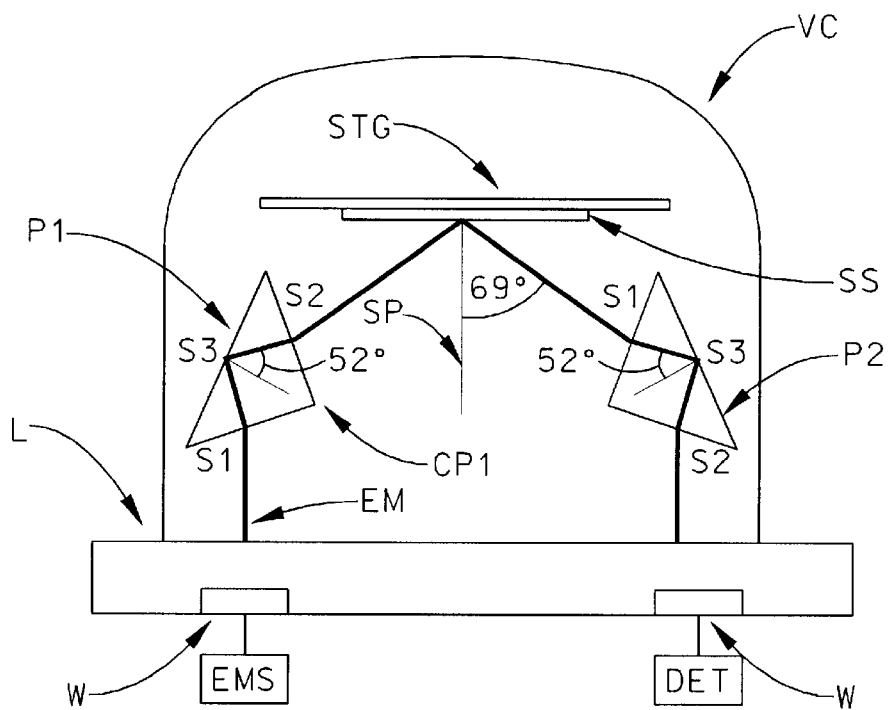
FIG. 1 shows a general geometrical configuration of the present invention as applied in a vertical vacuum chamber (VC).

Turning now to the Drawings, there is shown in FIG. 1 a general geometrical configuration of the present invention as applied in a vertical vacuum chamber (VC). In particular note the presence of a lid (L) with two windows (W) therein. FIG. 1 further shows that in use a beam of electromagnetic radiation (EM), which is provided by a source of electromagnetic radiation (EMS), passes through the leftmost window (W), interacts with a first prism (P1), which changes the propagation direction of said beam of electromagnetic radiation (EM), so that it interacts with a sample system (SS) which is held in place on a sample system holding stage (STG). After interaction with said sample system (SS), said beam of electromagnetic radiation interacts with the second prism (P2) such that the direction of propagation thereof is changed to direct it out of the rightmost second window (W2) into detector (DET). Note that both the first (P1) and second (P2) prisms each have three sides, (S1), (S2) and (S3). Sides (S1) and (S2) in each of said first (P1) and second (P2) prisms are equal in length and project from a common point (ie. (CP1) (CP2)), thereby making said first (P1) and second (P2) prisms each isosceles. In addition, the angle between said first (SI) and second (S2) sides in each of said first (P1) and second (P2) prisms is "acute", (to be interpreted to include ninety-degrees for the purposes of this Disclosure). The third side (S3) of each of said first (P1) and second (P2) prisms is a hypotenuse, and is oriented such that in each of the first (P1) and second (P2) prisms a perpendicular bisector thereof projects to intercept the common point from which sides (S1) and (S2) project. Continuing, note that the angle of incidence of the beam of electromagnetic radiation with respect to a normal to the third side (S3) of each of the first (P1) and second (P2) prisms is indicated as being nominally fifty-two (52) degrees, and the angle of incidence of the beam of electromagnetic radiation with respect to a normal to an investigated surface of the sample system (SS) is nominally sixty-nine (69) degrees. That is, the first (P1) and second (P2) prisms are each made of a material with refractive properties appropriate such that when the angle of incidence of the beam of electromagnetic radiation with respect to a normal to the third side (S3) of each of the first (P1) and second (P2) prisms is nominally fifty-two (52) degrees, then the angle of incidence of the beam of electromagnetic radiation with respect to a normal to an investigated surface of the sample system (SS) is nominally sixty-nine (69) degrees, (ie. less than seventy (70) degrees.

It can be appreciated that were a mirror placed in a plane (SP) which is simultaneously perpendicular to the investigated surface of said sample system (SS), and to projections from the midpoints of the third sides (S3) in each of the first (P1) and second (P2) prisms, through the associated respective common points (CP1) and (CP2) thereof, then the present invention system would be seen to be mirror-image symetrical with respect to said plane.

While not shown, it is to be understood that a present invention system as demonstrated in FIG. 1, can find application where complex system components, (eg. sputtering or electron beam source components and sample system handling robotics etc.), are additionally present within the vacuum chamber (VC). Present invention electromagnetic beam directing means can be used to direct electromagnetic beams around any number of such system components. Additionally, it is noted that more than two present invention electromagnetic beam directing means can be present, as required to direct an electromagnetic beam around all present system components to a sample system.

Figure 2:
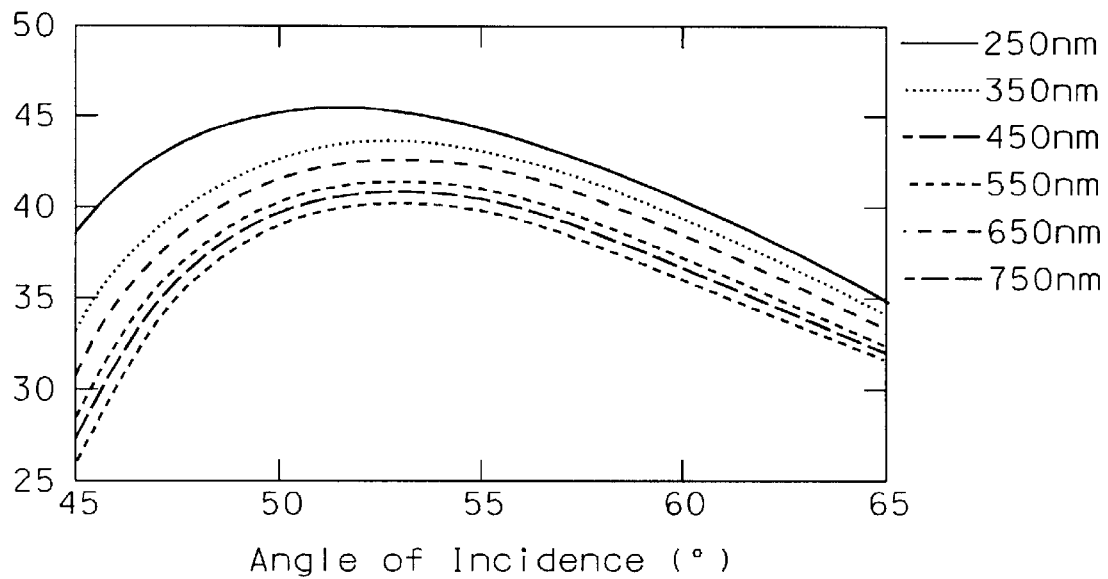
FIG. 2, shows the effect each of the present invention system first (P1) and second (P2) prisms has on phase angle between orthogonal components, (ie. the DELTA), of a beam of polarized light caused to interact therewith as a function of angle of incidence of said beam of polarized electromagnetic radiation with respect to said normal to the third side of said first (P1) or second (P2) prims.

Turning now to FIG. 2, there is shown the effect each of the first (P1) and second (P2) prisms has on phase angle between orthogonal components, (ie. the DELTA), of said beam of polarized light caused to interact therewith as a function of angle of incidence of said beam of polarized electromagnetic radiation with respect to said normal to the third side of said first (P1) or second (P2) prisms. Note that the effect on DELTA peaks where the angle of incidence is nominally fifty-two (52) degrees for wavelengths in the range of two-hundred-fifty (250) and seven-hundred-fifty (750) nanometers, and that said peak is very gradual. For instance, a variation in angle-of-incidence of said beam of polarized electromagnetic radiation with respect to said normal to the third side of said first (P1) or second (P2) prism of between approximately plus or minus one (1) degree causes a change in (DELTA) of, on the order of one (1) degree at any wavelength shown. This is important as it is possible for a first prism (P1) or second prism (P2) in a FIG. 1 vacuum chamber to vary slightly in position during use, perhaps as a result of heating effects of mechanical vibrations, such that the angle of incidence of said beam of polarized electromagnetic radiation with respect to said normal to the third side of said first (P1) or second (P2) prism changes. It is beneficial in determining sample system (SS) (PSI) and (DELTA) values if said change has as little as possible effect on the phase angle between orthogonal components of said polarized electromagnetic radiation.

It is noted that FIG. 1 indicates that where said beam of polarized light is caused to interact at an angle of incidence of said beam of polarized electromagnetic radiation with respect to said normal to the third side of said first (P1) or second (P2) prims nominally fifty-two (52) degrees, for wavelengths in the range of two-hundred-fifty (250) and seven-hundred-fifty (750) nanometers, then the angle of incidence of the beam of electromagnetic radiation exiting the second side (S2) of the first (P1) prism to the normal to said investigated surface of said sample system, (SS) is sixty-nine (69) degrees.

Figure 3:
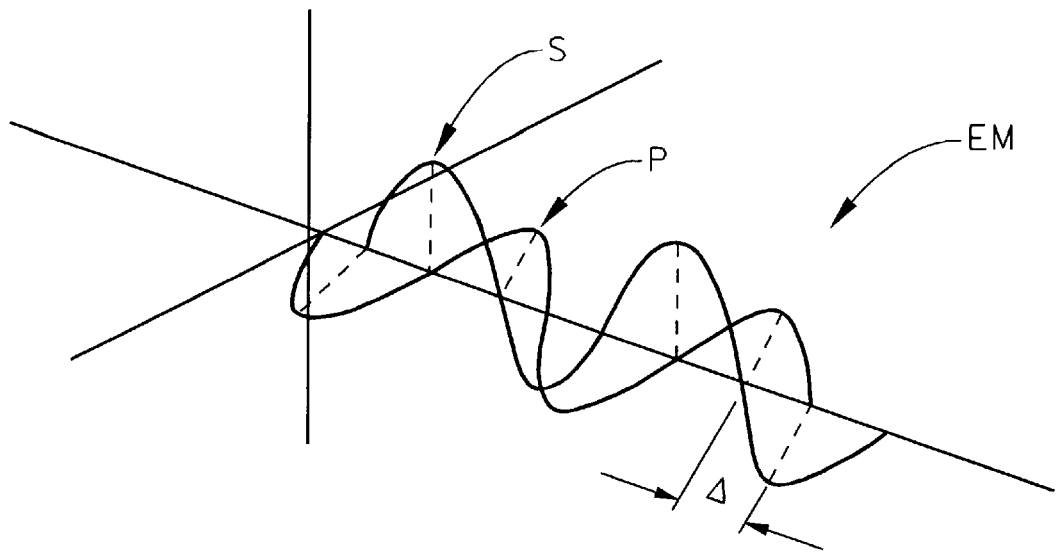
FIG. 3 shows a polarized beam of electromagnetic radiation (EM) indicating the presence of "P" and "S" orthogonal components.
Figure 4:
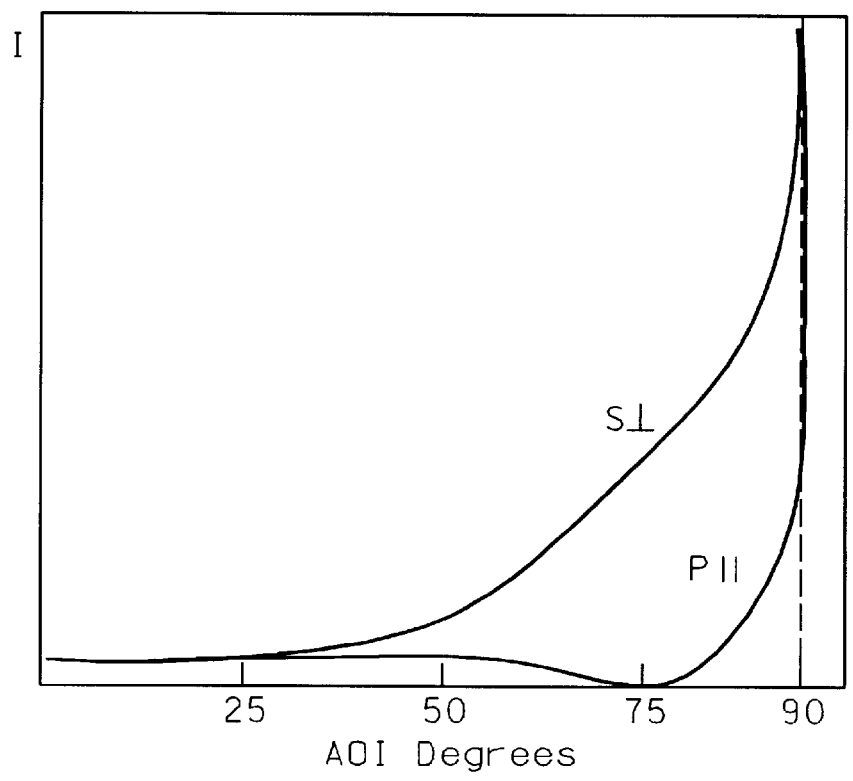
FIG. 4 shows typical plots of said "P" and "S" components as a function of angle-of-incidence to a normal to an investigated surface of a semiconductor sample system, such as shown in FIG. 1 as (SS). FIG.

For insight, FIG. 3 shows a polarized beam of electromagnetic radiation (EM) indicating the presence of "P" and "S" orthogonal components. FIG. 4 shows typical plots of said "P" and "S" components as a function of angle-of-incidence to a normal to an investigated surface of a semiconductor sample system, such as shown in FIG. 1 as (SS). Note in FIG. 4 that the "P" orthogonal component, (ie. the orthogonal component of the polarized electromagnetic beam parallel to a sample surface investigated surface), passes through essentially zero (0.0) at an angle-of-incidence of approximately seventy-five (75) degree.

Figure 5:
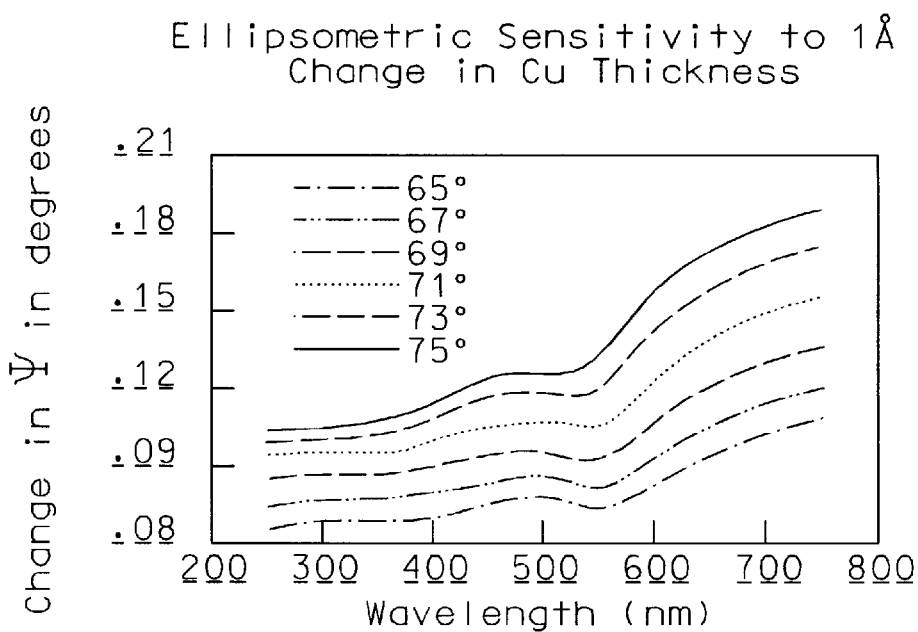
FIG. 5 shows present invention ellipsometric (PSI) data, obtained over a wavelength range of two-hundred (200) to seven-hundred-fifty (750) nanometers and over a range of angle-of-incidence to a normal to an investigated surface of a sample system of from sixty-five (65) to seventy-five (75) degrees.
Figure 6:
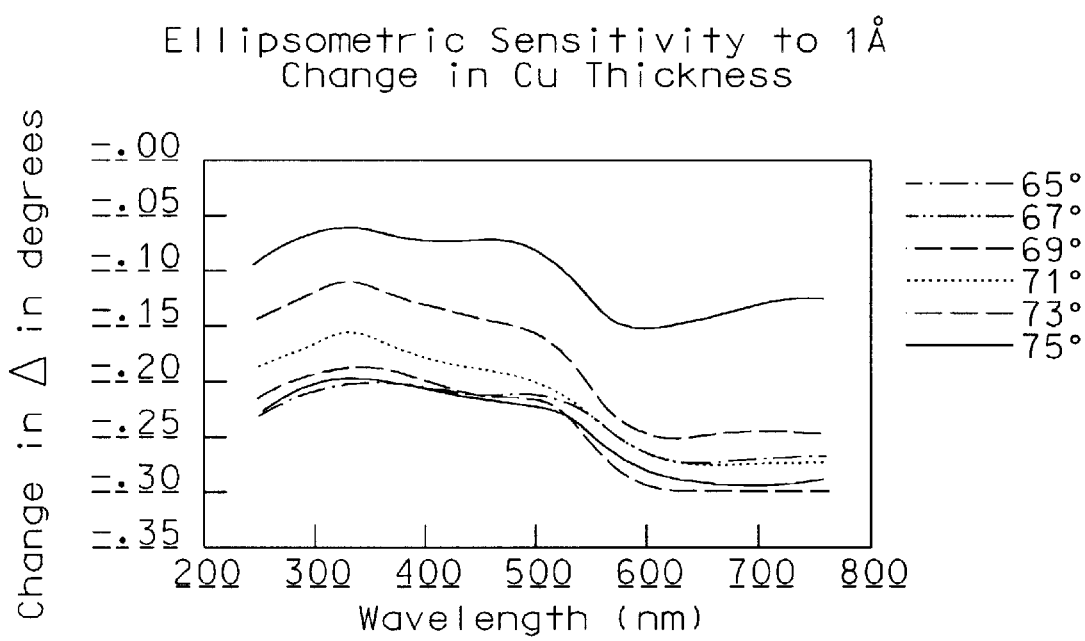
FIG. 6 shows present invention ellipsometric (DELTA) data obtained over a wavelength range of two-hundred (200) to seven-hundred-fifty (750) nanometers and over a range of angle-of-incidence to a normal to an investigated surface of a sample system of from sixty-five (65) to seventy-five (75) degrees.

This is the well known "Brewster" angle. It is further noted that typical ellipsometric practice involves measuring the ration of said "P" and "S" components to provide a (PSI) value, as well as measuring a phase angle (DELTA) between said "P" and "S" orthogonal components. A ratio of orthogonal components (P/S), it will be appreciated from FIG. 4, will be most significant at the Brewster Angle, and, as a result, it is typical ellipsometric practice to obtain measurement data utilizing a Brewster angle of incidence. This is in contrast to the present invention practice of intentionally avoiding the Brewster angle by many degrees, (eg. nominally an angle of incidence to a normal to an investigated surface of a sample system of sixty-nine (69) degrees is utilized). The present invention teaches use of an angle of incidence to a normal to an investigated surface of a sample system of less than seventy (70) degrees. FIGS. 5 & 6 provide insight as to why the present invention utilizes an angle of incidence to a normal to an investigated surface of a sample system of less than seventy (70) degrees.

As general information, it is noted that the practice of ellipsometry generally comprises:
  a. experimentally obtaining (PSI) and (DELTA) data, (or mathematically equivalent), at a plurality of electromagnetic beam angles-of-incidence to a normal to the surface of a sample system and at a plurality of electromagnetic beam wavelengths;

b. proposing a mathematical model for the ellipsometer system, (including effects of all components which effect change in polarization state of a beam of electromagnetic radiation which interacts therewith), and a monitored sample system, said mathematical model comprising a plurality of parameters, (eg. refractive properties and thicknesses of various ellipsometer system components and of layers applied to the surface of said sample system);

c. calculating (PSI) and (DELTA) data, (or mathematically equivalent), at said plurality of electromagnetic beam angles-of-incidence to a normal to the surface of a sample system and at said plurality of electromagnetic beam wavelengths;

d. applying a mathematical technique, (eg. square error reducing regression), to evaluate at least some of said plurality of parameters in said mathematical model.

Where a good fit between mathematical model calculated and experimentally obtaining (PSI) and (DELTA) data, (or mathematically equivalent), is achieved, ellipsometry practice provides that it is to some level of confidence likely that the sample system investigated is accurately represented by the mathematical model, with the parameters therein evaluated in step d.

FIG. 5 shows ellipsometric (PSI) data, and FIG. 6 shows ellipsometric (DELTA) data obtained over a wavelength range of two-hundred (200) to seven-hundred-fifty (750) nanometers and over a range of angle-of-incidence to a normal to an investigated surface of a sample system of from sixty-five (65) to seventy-five (75) degrees. The data presented in FIGS. 5 and 6 reflects change in (PSI) or (DELTA), respectively, when a system as depicted in FIG. 1 is utilized to investigate a sample system which has had one a (1.0) Angstrom change in depth of copper deposited thereupon. That is, FIGS. 5 and 6 are sensitivity plots which present change in (PSI) and (DELTA), respectively, resulting from a change in depth of copper deposition amounting to one (1.0) Angstrom. Now, note in FIG. 5 that sensitivity to change in depth of copper, (ie. change in (PSI)), increases with increasing angle-of-incidence to a normal to an investigated surface of a sample system; but the FIG. 6 shows that sensitivity to change in depth of copper, (ie. change in (DELTA)), decreases with increasing angle-of-incidence to a normal to an investigated surface of a sample system. That is, as the angle-of-incidence to a normal to an investigated surface of a sample system is increased, ellipsometric (DELTA) sensitivity is lost.

Continuing, FIG. 1 type systems are increasingly being utilized to monitor real-time deposition of materials to an investigated surface of a sample system, and it is to be appreciated that it is generally beneficial to optimize both (PSI) and (DELTA) sensitivity to change in depth of a depositing material where process control is to be effected utilizing ellipsometric data obtained in real-time. In particular, sensitivity to change in ellipsometric (DELTA) allows great increase in sensitivity to change in depth of a deposited material, as compared to that provided by high sensitivity in (PSI) to said change in depth of a deposited material. This is the basis of the great benefit provided by ellipsometric data over simple reflection data. And, as alluded to infra herein, the better the sensitivity of both (PSI) and (DELTA) to changes in a sample system, the more accurately said sample system can be investigated.

In view of the foregoing, the present invention provides that a good compromise angle-of-incidence to a normal to an investigated surface of a sample system, which allows good sensitivity in both ellipsometric (PSI) and (DELTA) data, is nominally sixty-nine (69) degrees. Again, this is in contrast to generally accepted ellipsometric practice which provides that the Brewster angle-of-incidence to a normal to an investigated surface of a sample system should be utilized, (which again, in semiconductors is approximately seventy-five (75) degrees).

It is noted that what is arguably the most relevant prior art known to the Inventors herein, (ie. the recent paper by Lehnert et al. titled "In Situ Spectroscopic Ellipsometry For Advanced Process Control In Vertical Furnace"), which was cited in the Background Section of this Disclosure, teaches use of an angle-of-incidence to a normal to an investigated surface of a sample system of between seventy (70) and seventy-five (75) degrees, in a scenario similar to that described herein. Nothing is said recent Lehnert et al. paper remotely suggests that an angle-of-incidence to a normal to an investigated surface of a to sample system of less than seventy (70) degrees be utilized. It is only in view of FIGS. 5 and 6 herein that the benefit inherent in simultaneous increasing both (PSI) and (DELTA) sensitivity is achieved by utilizing an angle-of-incidence to a normal to an investigated surface of a sample system of less than seventy (70) degrees is shown to be beneficial. The improvement over prior art taught by the present invention then is found in the use of an angle-of-incidence to a normal to an investigated surface of a sample system of less then severity (70) degrees, for the simultaneous (PSI) and (DELTA) sensitivity increasing effects available at said angles-of-incidence.

Finally, a typical application of the present invention will be real-time monitoring of the surface of a sample system as layers of material are deposited thereupon, or etched away. It will be appreciated by those skilled in the art that the present invention achieved increase in sensitivity of change in both ellipsometric (PSI) and ellipsometric (DELTA), to changes in sample system material layer thickness, while minimizing sensitivity to small changes in electromagnetic beam directing means orientation, provides great utility in such real-time material layer deposition and/or etching settings. As well, it will be appreciated by those skilled in the art that conventional teachings, which promote use of angle-of-incidence of an ellipsometer electromagnetic beam to a normal to an investigated surface of a sample system near the Brewster angle, are contrary to the present invention teachings, and lead away from the present invention teachings.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. An ellipsometer/polarimeter system comprising:

a. a source of a polarized spectroscopic beam of electromagnetic radiation;

b. first optional component(s);

c. a first electromagnetic beam directing means;

d. a stage for holding a sample system;

e. second optional component(s);

f. a second electromagnetic beam directing means; and g. a detector system;

each of said first and second electromagnetic beam directing means being an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides;

said ellipsometer/polarimeter system having, in use, a sample system comprising a surface, held in position at said stage for holding a sample system;

said ellipsometer/polarimeter system being arranged such that, in use, said source of a beam of electromagnetic radiation provides a spectroscopic polarized beam of electromagnetic radiation with a direction of propagation oriented so as to enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means;

which spectroscopic polarized beam of electromagnetic radiation exiting said second or first side of said first electromagnetic beam directing means propagates in direction which has an angle of incidence with respect to a normal to said surface of said sample system of less than seventy (70) degrees;

such that said spectroscopic polarized beam of electromagnetic radiation which reflects from said sample system propagates in a direction so as to enter the first or second side of said second electromagnetic beam directing means, internally reflects from the third side of said second electromagnetic beam directing means at an angle of incidence with respect to a normal to said third side of said second electromagnetic beam directing means, and exits from, respectively, said second or first side of said second electromagnetic beam directing means and propagates therefrom in a direction such that it enters said detector system;

said first electromagnetic beam directing means and said second electromagnetic beam directing means being oriented essentially as mirror images of one another with respect to a plane which is simultaneously perpendicular to the surface of said sample system and to a plane which contains perpendiculars to the third sides of both said first and second electromagnetic beam directing means;

in said ellipsometer/polarimeter system the improvements being:

that each of said first and second electromagnetic beam directing means are made of a material with refractive properties such that when the angle of incidence of said spectroscopic polarized beam of electromagnetic radiation which reflects from the third side thereof, with respect to a normal to said third side is nominally fifty-two (52) degrees, the angle of incidence of said spectroscopic polarized beam of electromagnetic radiation with respect to a normal to a surface of said sample system is less than seventy (70) degrees; and when the angle of incidence of said spectroscopic polarized beam of electromagnetic radiation which reflects from the third side of each said first or second electromagnetic beam directing means is varied by plus or minus one (1) degree around said nominal fifty-two (52) degrees, the retardation entered between orthogonal components in said spectroscopic polarized beam of electromagnetic radiation varies by, on the order of one (1) degree at any wavelength between two-hundred-fifty (250) and seven-hundred-fifty (750) nanometers.

2. An ellipsometer/polarimeter system as in claim 1, in which each of said first and second electromagnetic beam directing means is made of fused quartz and the angle of incidence of said spectroscopic polarized beam of electromagnetic radiation which reflects from the third side thereof, with respect to a normal to said third side, is nominally fifty-two (52) degrees when said angle of incidence of said spectroscopic polarized beam of electromagnetic radiation with respect to a normal to a surface of said sample system is nominally sixty-nine (69) degrees.

3. An ellipsometer/polarimeter system as in claim 2, which comprises at least one additional electromagnetic beam directing means positioned so as to receive said spectroscopic polarized beam of electromagnetic radiation and redirect its direction of propagation.

4. An ellipsometer/polarimeter system as in claim 1, in which the first optional component(s) and second optional component(s) each comprise a window in a vacuum chamber, which vacuum chamber contains said first electromagnetic beam directing means, said stage for holding a sample system-and said second electromagnetic beam directing means.

5. An ellipsometer/polarimeter system as in claim 4, which comprises at least one additional electromagnetic beam directing means positioned so as to receive said spectroscopic polarized beam of electromagnetic radiation and redirect its direction of propagation.

6. An ellipsometer/polarimeter system as in claim 1, in which the change in ellipsometric DELTA phase angle between orthogonal compopents in said spectroscopic polarized beam of electromagnetic radiation which reflects from the third side of each of said first and second electromagnetic beam directing means which is within the range of nominally forty-six (46) to thirty-nine (39) degrees for wavelengths within the respective range of approximately two-hundred-fifty (250) to seven-hundred-fifty (750) nanometers.

7. An ellipsometer/polarimeter system as in claim 6, which comprises at least one additional electromagnetic beam directing means positioned so as to receive said spectroscopic polarized beam of electromagnetic radiation and redirect its direction of propagation.

8. An ellipsometer/polarimeter system as in claim 1, which comprises at least one additional electromagnetic beam directing means positioned so as to receive said spectroscopic polarized beam of electromagnetic radiation and redirect its direction of propagation.

9. An ellipsometer/polarimeter system comprising:
   a. source of a polarized spectroscopic beam of electromagnetic radiation;
   b. first optional component(s);
   c. a first electromagnetic beam directing means;
   d. a stage for holding a sample system;
   e. second optional component(s);
   f. a second electromagnetic beam ditecting means; and
   g. a detector system;
      said first optional component(s) and second optional component(s) each comprising a window in a vacuum chamber which contains said first electromagnetic beam directing means, said stage for holding a sample system and said second electromagnetic beam directing means;

each of said first and second electromagnetic beam directing means being an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides;

said ellipsometer/polarimeter system having, in use, a sample system comprising a surface, held in position at said stage for holding a sample system;

said ellipsometer/polarimeter system being arranged such that, in use, said source of a beam of electromagnetic radiation provides a spectroscopic polarized beam of electromagnetic radiation with a direction of propagation oriented so as to pass through said first optional component(s) and enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means;

which spectroscopic polarized beam of electromagnetic radiation exiting said second or first side of said first electromagnetic beam directing means propagates in direction which has an angle of incidence with respect to a normal to said surface of said sample system of less than seventy (70) degrees;

such that said spectroscopic polarized beam of electromagnetic radiation which reflects from said sample system propagates in a direction so as to enter the first or second side of said second electromagnetic beam directing means internally reflect from the third side of said second electromagnetic beam directing means at an angle of incidence with respect to a normal to said third side of said second electromagnetic beam directing meansy and exit from, respectively, said second or first side of said second electromagnetic beam directing means and propagates therefrom in a direction such that it passes through said second optional component(s) and enters said detector system;

said first-electromagnetic beam directing means and said second electromagnetic beam directing means being oriented essentially as mirror images of one another with respect to a plane which is simultaneously perpendicular to the surface of said sample system and to a plane which contains perpendiculars to the third sides of both said first and second electromagnetic beam directing means;

in said ellipsometer/polarimeter system the improvements being that:

each of said first and second electromagnetic beam directing means are made of fused quartz which demonstrates refractive properties such that the angle of incidence of said spectroscopic polarized beam of electromagnetic radiation which reflects from the third side thereof, with respect to a normal to said third side, is nominally fifty-two (52) degrees when said angle of incidence of said spectroscopic polarized beam of electromagnetic radiation with respect to a normal to a surface of said sample system is nominally sixty-nine (69) degrees; and each said first and second electromagnetic beam directing means cause, in use, a change in ellipsometric DELTA phase angle between orthogonal components in said spectroscopic polarized beam of erectromagnetic radiation which reflects from the third side of each of said first and second electromagnetic beam directing means which is within the range of approximately forty-six (46) to thirty-nine (39) degrees for wavelengths within the respective range of approximately two-hundred-fifty (250) to seven-hundred-fifty (750) nanometers; and when the angle of incidence of said spectroscopic polarized beam of electromagnetic radiation which reflects from the third side of each said first or second electromagnetic beam directing means is varied by plus or minus one (1) degree around said nominal fifty-two (52) degrees, the retardation entered between orthogonal components in said spectroscopic polarized beam of electromagnetic radiation varies by, on the order of one (1) degree at any wavelength between two-hundred-fifty (250) and seven-hundred-fifty (750) nanometers.

10. An ellipsometer/polarimeter system as in claim 9, which comprises at least one additional electromagnetic beam directing means positioned so as to receive said spectroscopic polarized beam of electromagnetic radiation and redirect its direction of propagation.

11. A method of investigating ellipsometric properties of a sample system comprising the steps of:

1. providing an ellipsometer/polarimeter system comprising:
   a. a source of a polarazed spectroscopic beam of electromagnetic radiation;
   b. first optional component(s);
   c. a first electromagnetic beam directing means;
   d. a stage for holding a sample system;
   e. second optional component(s);
   f. a second electromagnetic beam directing means; and
   g. a detector system;
      each of said first and second electromagnetic beam directing means being an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides;
      said ellipsometer/polarimeter system having, in use, a sample system comprising a surface, held in position at said stage for holding a sample system;
      said ellipsometer/polarineter system being arranged such that, in use, said source of a beam of electromagnetic radiation provides a spectroscopic polarized beam of electromagnetic radiation with a direction of propagation oriented so as to enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means;
      which spectroscopic polarized beam of electromagnetic radiation exiting said second or first side of said first electromagnetic beam directing means propagates in direction which has an angle of incidence with respect to a normal to said surface of said sample system of less than seventy (70) degrees;

such that said spectroscopic polarized beam of electromagnetic radiation which reflects from said sample system propagates in a direct on so as to enter the first or second side of said second electromagnetic beam directing means, internally reflects from the third side of said second electromagnetic beam directing means at an angle of incidence with respect to a normal to said third side of said second electrwagnetic beam directing means, and exits fromt respectively, said second or first side of said second electromagnetic beam directing means and propagates therefrom in a direction such that it enters said detector system;

said first electromagnetic beam directing means and said second electromagnetic beam directing means being oriented essentially as mirror images of one another with respect to a plane which is simultaneously perpendicular to the surface of said sample system and to a plane which contains perpendiculars to the third sides of both said first and second electromagnetic beam directing means;

in said ellipsometer/polarimeter system the improvements being:

that each of said first and second electromagnetic beam directing means are made of a material with refractive properties such that when the angle of incidence of said spectroscopic polarized beam of electromagnetic radiation which reflects from the third side thereof, with respect to a normal to said third side is nominally fifty-two (52) degrees, the angle of incidence of said spectroscopic polarized beam of electromagnetic radiation with respect to a normal to a surface of said sample system is less than seventy (70) degrees; and when the angle of incidence of said spectroscopic polarized beam of electromagnetic radiation which reflects from the third side of each said first or second electromagnetic beam directing means is varied by plus or minus one (1) degree around said nominal fifty-two (52) degrees, the reardtion entered between orthogonal components in said spectroscopic polarized beam of electromagnetic radiation varies by, on the order of one (1) degree at any wavelength between two-hundred-fifty (250) and seven-hundred-fifty (750) nanomoters;

2. placing a sample system so that it is hold in place at said stage for holding a sample system;

3. causing said source of a polarized spectroscopic beam of electromagnetic radiation to emit a polarized spectroscopic beam of electromagnetic-radiation;

4. receiving said beam of spectroscopic polarized radiation in said-detector after it has interacted with said first electromagnetic beam directing means, said stage for holding a sample system and said second electromagnetic beam directing means;

such that said detector provides data based upon the received spectrscopic polarized beam of electromagnetic radiation, which data mediates investigation of the ellipsometric properties of said sample system.

12. A method of investigating ellipsometric properties of a sample system comprising the steps of:

1. providing an ellipsometer/polarimeter system comprising:

a. a source of a polarized spectroscopic beam of electromagnetic radiation;
   b. first optional component(s);
   c. a first electromagnetic beam directing means;
   d. a stage for holding a sample system;
   e. second optional component(s);
   f. a second electromagnetic beam directing means; and
   g. a detector system;

said first optional component(s) and second optional component(s) each comprising a window in a vacuum chamber which contains said first electromagnetic beam directing means, said stage for holding a sample system and said second electromagnetic beam directing means;

each of said first and second electromagnetic beam directing means being an isosceles prism comprising first and second sides which project at an acute angle, including ninety-degrees, with respect to one another from a common point, said first and second sides in each of said first and second isosceles prisms being intercepted by a third side thereof which is oriented such that the locus of a perpendicular thereto at a midpoint thereof passes through said common point between said first and second sides;

said ellipsometer/polarimeter system having, in use, a sample system comprising a surface, held in position at said stage for holding a sample system;

said ellipsometer/polarimpter system being arranged such that, in use, said source of a beam of electromagnetic radiation provides a spectroscopic polarized beam of electromagnetic radiation with a direction of propagation oriented so as to pass through said first optional component(s) and enter the first or second side of said first electromagnetic beam directing means, internally reflect from the third side thereof at an angle of incidence with respect to a normal to said third side of said first electromagnetic beam directing means, and exit from, respectively, said second or first side of said first electromagnetic beam directing means;

which spectroscopic polarized beam of electromagnetic radiation exiting said second or first side of said first electromagnetic beam directing means propagates in direction which has an angle of incidence with respect to a normal to said surface of said sample system of less than seventy (70) degrees;

such that said spectroscopic polarized beam of electromagnetic radiation which reflects from said sample system propagates in a direction so as to enter the first or second side of said second electromagnetic beam directing means, internally reflect from the third side of said second electromagnetic beam directing means at an angle of incidence with respect to a normal to said third side of said second electromagnetic beam directing means, and exit from, respectively, said second or first side of said second electromagnetic beam directing means and propagates therefrom in a direction such that it passes through said second optional component(s) and enters said detector system;

said first electromagnetic beam directing means and said second electromagnetic beam directing means being oriented essentially as mirror images of one another with respect to a plane which is simultaneously perpendicular to the surface of said sample system and to a plane which contains perpendiculars to the third sides of both said first and second electromagnetic beam directing means;

in said ellipsometer/polarimeter system the improvements being that:

each of said first and second electromagnetic beam directing means are made of fused quartz which demonstrates refractive properties such that the angle of incidence of said spectroscopic polarized beam of electromagnetic radiation which reflects from the third side thereof, with respect to a normal to said third side, is nominally fifty-two (52) degrees when said angle of incidence of said spectroscopic polarized beam of electromagnetic radiation with respect to a normal to a surface of said sample system is nominally sixty-nine (69) degrees; and each said first and second electromagnetic beam directing means cause, in use, a change in ellipsometric DELTA phase angle between orthogonal components in said spectroscopic polarized beam of electromagnetic radiation which reflects from the third side of each of said first and second electromagnetic beam directing means which is within the range of approximately forty-six (46) to thirty-nine (39) degrees for wavelengths within the respective range of approximately two-hundred-fifty (250) to seven-hundred-fifty (750) nanometers; and when the angle of incidence of said spectroscopic polarized beam of electromagnetic radiation which reflects from the third side of each said first or second electromagnetic beam directing means is varied by plus or minus one (1) degree around said nominal fifty-two (52) degrees, the retardation entered between orthogonal components in said spectroscopic polarized beam of electromagnetic radiation varies by, on the order of one (1) degree at any wavelength between two-hundred-fifty (250) and seven-hundred-fifty (750) nanometers;

said method further compising the steps of:

2. placing a sample system so that it is held in place at said stage for holding a sample system;

3. causing said source of a polarized spectroscopic beam of electromagnetic radiation to emit a polatoized spectroscopic beam of electromagnetic radiation;

4. receiving said beam of spectroscopic polarized radiation in said detector after it has interacted with said first electromagnetic beam directing means, said stage for holding a sample system and said second electromagnetic beam directing means;

such that said detector provides data based upon the received speciroscopic polarized beam of electromagnetic radiation, which data mediates investigation of the ellipsometric properties of said sample system.

* * * * *